US 8,281,393 B2

(12) United States Patent
Sallam

(10) Patent No.: US 8,281,393 B2
(45) Date of Patent: Oct. 2, 2012

(54) METHOD AND SYSTEM FOR DETECTING WINDOWS ROOTKIT THAT MODIFIES THE KERNEL MODE SYSTEM SERVICE DISPATCH TABLE

(75) Inventor: Ahmed Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 889 days.

(21) Appl. No.: 11/594,095

(22) Filed: Nov. 8, 2006

(65) Prior Publication Data
US 2008/0127344 A1 May 29, 2008

(51) Int. Cl.
*G06F 21/00* (2006.01)
(52) U.S. Cl. ........... 726/22; 726/23; 726/24; 726/25; 713/164
(58) Field of Classification Search .......... 726/22–25; 713/164; 714/47
See application file for complete search history.

(56) References Cited

U.S. PATENT DOCUMENTS

| | | | |
|---|---|---|---|
| 7,647,636 B2 * | 1/2010 | Polyakov et al. ............ | 726/24 |
| 2004/0015712 A1 * | 1/2004 | Szor ............... | 713/200 |
| 2005/0204205 A1 * | 9/2005 | Ring et al. ............. | 714/47 |
| 2007/0022287 A1 * | 1/2007 | Beck et al. ............ | 713/164 |

OTHER PUBLICATIONS

OSR Online, Nt vs. Zw—Clearing Confusion on The Native API, The NT Insider, vol. 10, Issue 4, Aug. 15, 2003 (9 pages).
Butler, J. and Silberman, P., Raide: Rootkit Analysis Identification Elimination, Black Hat Briefings, Mar. 18, 2006 (42 pages).
Russinovich, M., Inside the Native APE, Nov. 23, 2004, retrieved from http://web.archive.org/web/20060427122342/http://www.sysinternals.com/Information/NativeApi.html (13 pages).
Ries, C., Inside Windows Rootkits, Vigilantminds Inc., May 22, 2006 (28 pages).
Keong, T. C., Defeating Kernal Native API Hookers by Direct KiServiceTable Restoration, SIG2—Security and Information InteGrity, Oct. 23, 2004 (72 pages).

* cited by examiner

*Primary Examiner* — Jeffrey Pwu
*Assistant Examiner* — Thong Truong
(74) *Attorney, Agent, or Firm* — Patent Capital Group

(57) ABSTRACT

A method, system, and computer program product for detecting a kernel-mode rootkit that hooks the System Service Dispatch Table (SSDT) is secure, avoids false positives, and does not disable security applications. A method for detecting a rootkit comprises the steps of calling a function that accesses a system service directly, receiving results from calling the function that accesses the system service directly, calling a function that accesses the system service indirectly, receiving results from calling the function that accesses the system service indirectly, and comparing the received results from calling the function that accesses the system service directly and the received results from calling the function that accesses the system service indirectly to determine presence of a rootkit.

22 Claims, 6 Drawing Sheets

METHOD AND SYSTEM FOR DETECTING WINDOWS ROOTKIT THAT MODIFIES THE KERNEL MODE SYSTEM SERVICE DISPATCH TABLE

BACKGROUND OF THE INVENTION

1. Field of the Invention

The present invention relates to detecting a kernel-mode rootkit that hooks the Windows System Service Dispatch Table.

2. Description of the Related Art

A rootkit is a set of software tools intended to conceal running processes, files or system data, thereby helping an intruder to maintain access to a system whilst avoiding detection. Rootkits are known to exist for a variety of operating systems such as Linux, Solaris and versions of Microsoft Windows. Rootkits often modify parts of the operating system or install themselves as drivers or kernel modules. Rootkits needs to hide something whether it is a process, a thread, a file, or a registry entry, etc. from user mode applications and from kernel mode device drivers. To achieve that, Rootkits have to alter the execution path of the file system, the processes, the threads and the registry functions.

One popular technique used by Rootkits device drivers is to hook the file system, the process, and the registry query functions inside the System Service Dispatch Table (SSDT) by replacing the functions pointers inside the SSDT table with new pointers that point to their own functions. This change of the execution path would affect all Nt/Zw function calls made by user mode applications and all Zw function calls made by kernel mode device drivers.

One technique for detecting rootkits involves spawning a user-mode investigator process that calls into the user mode Nt functions to enumerate processes and then compare the returned process list with another process list obtained by a controlling kernel mode device driver that calls directly into the Nt functions inside the NT OS Kernel.

Although this technique seems to be a good technique to detect rootkits that hook into the SSDT, it is actually based on spawning of a user mode investigator process. The user mode investigator process is called from another user-mode process (the controlling process). The controlling process will have to communicate with the kernel mode controlling device driver. The usage of user mode processes is not very secure and can be detected by the rootkits device drivers, which can terminate those processes once they are launched.

Some other rootkits detection methods check the System Service Dispatch Table (SSDT) looking for any changes made to the table. For example, one method looks for changes made to certain functions inside the SSDT (mostly the query functions used by rootkits) and then restores those changes to their original values. The main disadvantage of this approach is that the existence of a function hook inside the SSDT is not an indication of the existence of a rootkit, since intrusion prevention solutions typically hook the same functions as those hooked by the rootkits. Therefore, such techniques will generate false positives and will disable security applications.

A need arises for a technique by which a kernel-mode rootkit that hooks the System Service Dispatch Table (SSDT) may be detected that is secure, avoids false positives, and does not disable security applications.

SUMMARY OF THE INVENTION

A method, system, and computer program product for detecting a kernel-mode rootkit that hooks the System Service Dispatch Table (SSDT) is secure, avoids false positives, and does not disable security applications.

A method for detecting a rootkit comprises the steps of calling a function that accesses a system service directly, receiving results from calling the function that accesses the system service directly, calling a function that accesses the system service indirectly, receiving results from calling the function that accesses the system service indirectly, and comparing the received results from calling the function that accesses the system service directly and the received results from calling the function that accesses the system service indirectly to determine presence of a rootkit.

The step of calling the function that accesses the system service indirectly may comprise the steps of calling a function that obtains an address of the function that accesses a system service directly, and calling the function that accesses a system service directly using the obtained address. The address of the function that accesses a system service directly may be obtained from a table of addresses of functions that access system services directly. The address in the table of the function that accesses a system service directly may have been replaced with an address of a rootkit function. The rootkit function may be operable to hide a process, a thread, a file or a registry entry.

The function that accesses the system service directly may be a MICROSOFT WINDOWS® kernel mode Nt function, and the function that accesses the system service indirectly is a MICROSOFT WINDOWS® user mode Nt function or a MICROSOFT WINDOWS® Zw function. The address of the MICROSOFT WINDOWS® kernel mode Nt function may be obtained from a system service dispatch table. The address in the system service dispatch table of the MICROSOFT WINDOWS® kernel mode Nt function may have been replaced with an address of a rootkit function. The rootkit function may be operable to hide a process, a thread, a file or a registry entry.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The MICROSOFT WINDOWS NT® operating system includes a hidden API that the operating system uses internally. This API, which is called the Native API, is almost entirely hidden from view, with only a handful of its function documented in generally accessible publications. The Windows NT Native API serves one purpose: as a means for calling operating system services located in kernel mode in a controlled manner. Kernel mode is where the core of NT executes, and it is in kernel mode that components have direct access to hardware and services that perform management of the computer's resources including memory, devices and processes. Thus, whenever a program executing in user mode wants to perform I/O, allocate or deallocate virtual memory, start a thread or process, or interact with global resources, it must call upon one or more services that live in kernel mode.

Figure 1:
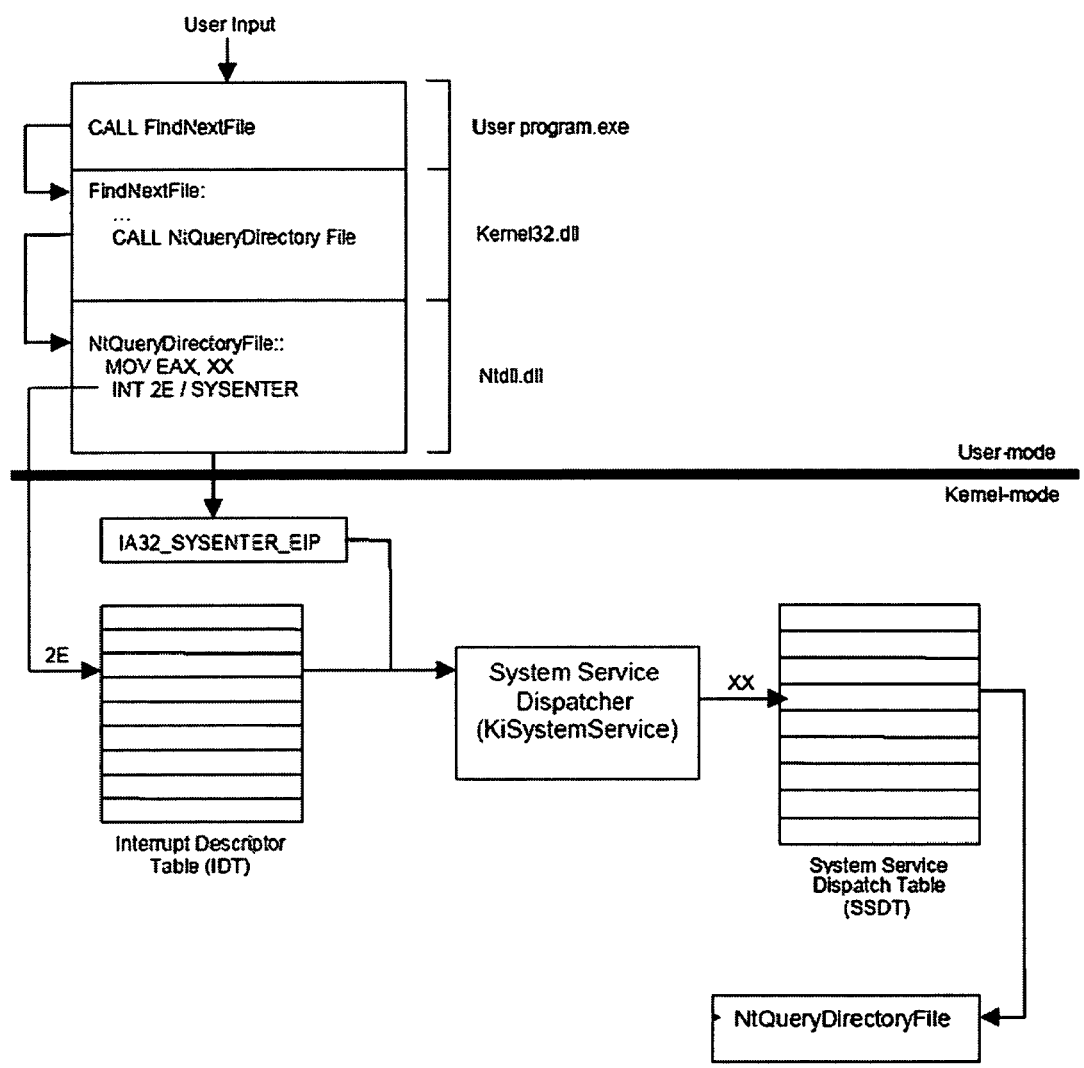
FIG. 1 is an exemplary block diagram of the architecture of an operating system, in which the present invention may be implemented.

An example of the architecture of the MICROSOFT WINDOWS NT® operating system is shown in FIG. 1.

Kernel Mode Nt/Zw Functions

The MICROSOFT WINDOWS NT® operating system Kernel provides two different sets of kernel services:
1. Nt functions
2. Zw functions Both of them are exported from the kernel executable file (ntoskrnl.exe). Nt functions are functions that start with "Nt" and the Zw functions are the functions that start with "Zw". Windows kernel mode device drivers normally call into the NT OS Kernel using exported Zw functions to execute kernel services.

The Zw functions have a similar implementation. Zw functions do the following:
1. Set the previous mode to be a kernel mode
2. Move the requested function index to the EAX register
3. Load a pointer to the function parameters to the EDX register
4. Call the KiSystemService function to handle the call to the appropriate Nt function.

An example of assembly language code that implements the ZwCreateFile function is as follows:

```
.text:0040C566         public _ZwCreateFile@44
.text:0040C566 _ZwCreateFile@44 proc near      ; CODE XREF:
.text:0040C566         mov eax, 25h
.text:0040C56B         lea edx, [esp+FileHandle]
.text:0040C56F         pushf
.text:0040C570         push 8
.text:0040C572         call _KiSystemService
.text:0040C577         retn 2Ch
.text:0040C577 _ZwCreateFile@44 endp ; sp = -8
```

User Mode Nt/Zw Functions

In the user mode space, the operating system kernel exports both the Zw and the Nt functions. The Native API is accessible through an alternate naming convention, one where command names begin with "Zw" instead of "Nt". Thus, ZwCreateFile( ) is an alias for NtCreateFile( ). The Zw and Nt functions are really identical functions and have the same function address.

When called by a user mode application, the Zw and Nt functions execute a processor special instruction that transfers the execution control from user mode to the kernel mode, the KiSystemService function, which is inside the operating system kernel.

KiSystemService

Figure 2:
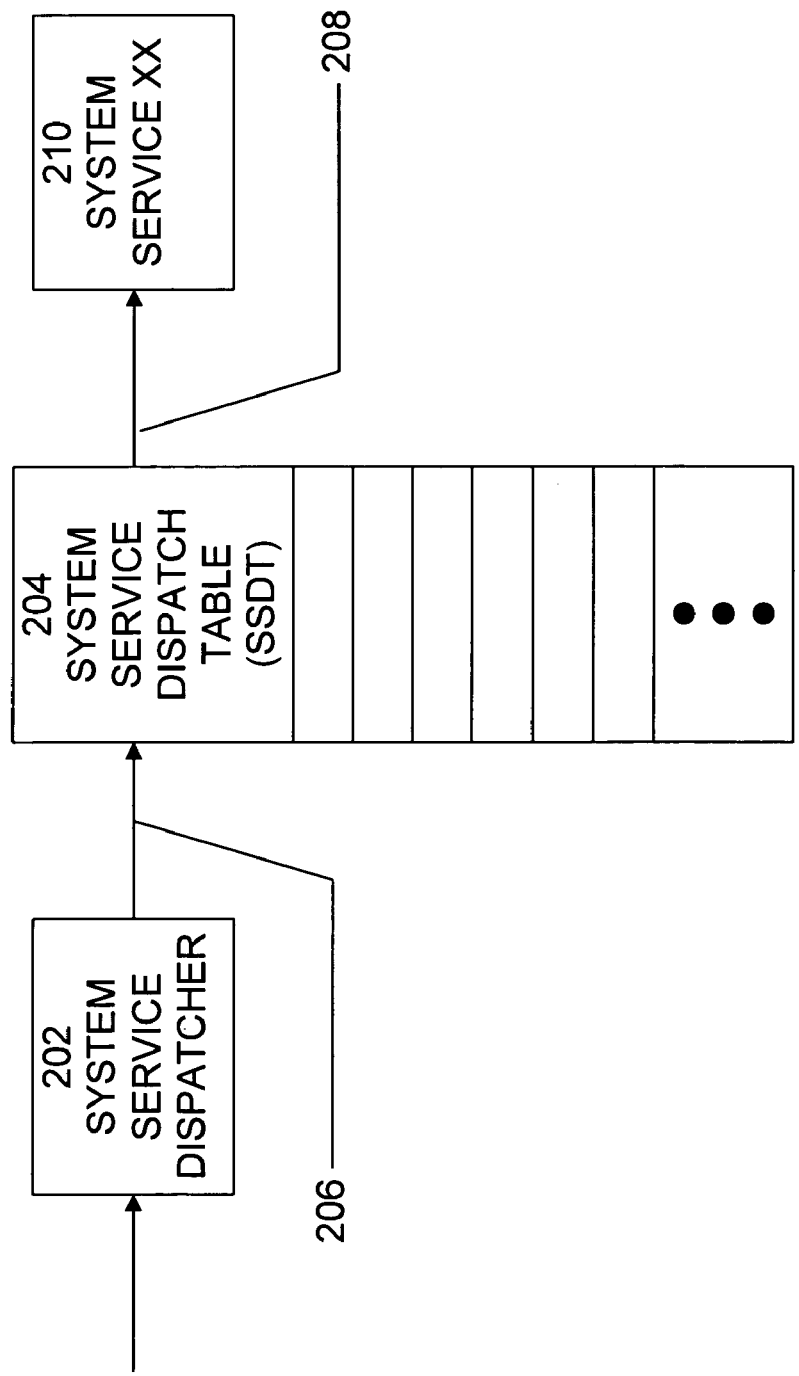
FIG. 2 is an exemplary block diagram of a system service dispatch arrangement, in which the present invention may be implemented.

As described above, the user-mode Nt/Zw functions and the kernel mode Zw functions call into the KiSystemService function. As shown in FIG. 2, calls to system services are handled by the system service dispatcher 202, which in MICROSOFT WINDOWS NT® is the KiSystemService function.

KiSystemService maintains a table of the actual Nt functions pointers. This table is called the kernel mode System Service Dispatch Table (SSDT) 204. The system service dispatcher 202 takes the requested function index from the EAX and the parameters pointer from the EDX register and uses them to index 206 into the SSDT 204 to get the actual function pointer 208. The function pointer 208 is then used to call the system service function 210.

Rootkits needs to hide something, whether it is a process, a thread, a file or a registry entry, etc. from user mode applications and from kernel mode device drivers. To achieve that, Rootkits have to alter the execution path of the file system, the processes, the threads and the registry functions.

Figure 3:
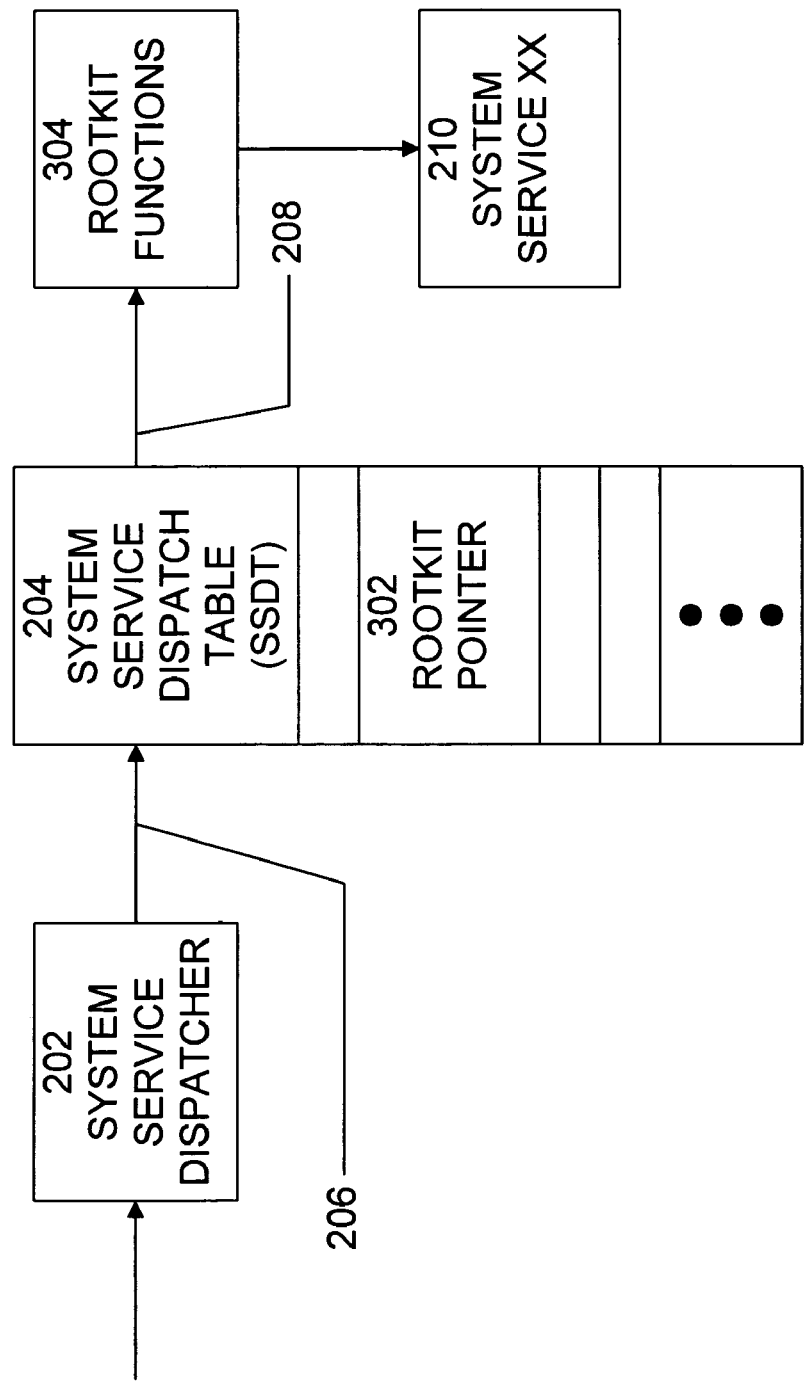
FIG. 3 is an exemplary block diagram of a system service dispatch arrangement that is infected by a rootkit, in which the present invention may be implemented.

In the example shown in FIG. 3, one technique used by Rootkits device drivers is to hook the file system, the process, and the registry query functions inside the SSDT by replacing the functions pointers inside the SSDT table with new pointers, such as rootkit pointer 302, which points to the rootkit functions 304. This change of the execution path would affect all Nt/Zw functions calls made by user mode applications and all Zw functions calls made by kernel mode device drivers. However, the change of execution path made by the rootkit does not affect the Nt function calls made in kernel mode.

Figure 4:
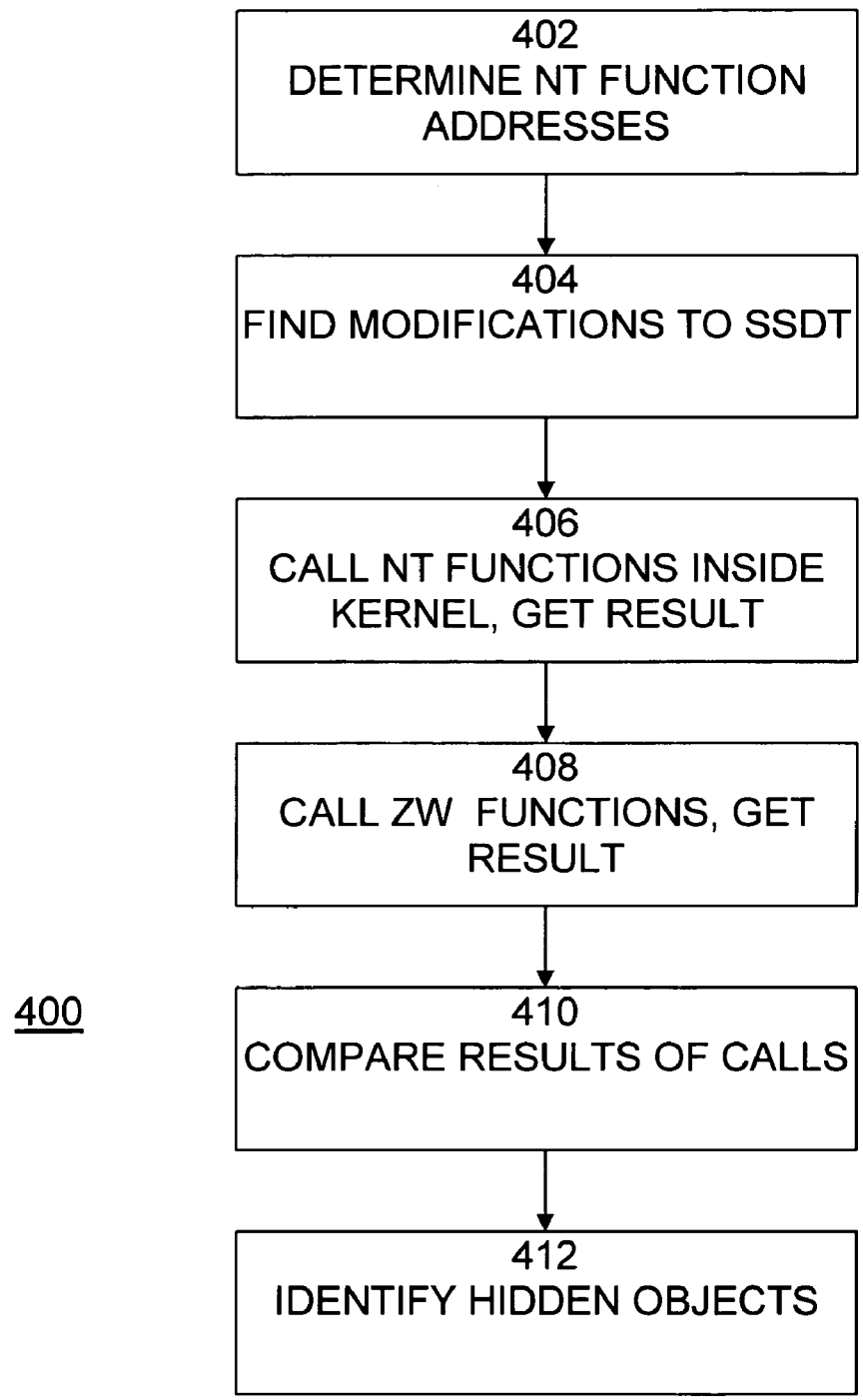
FIG. 4 is a flow diagram a process for detecting a rootkit, such as that shown in FIG. 3.
Figure 5:
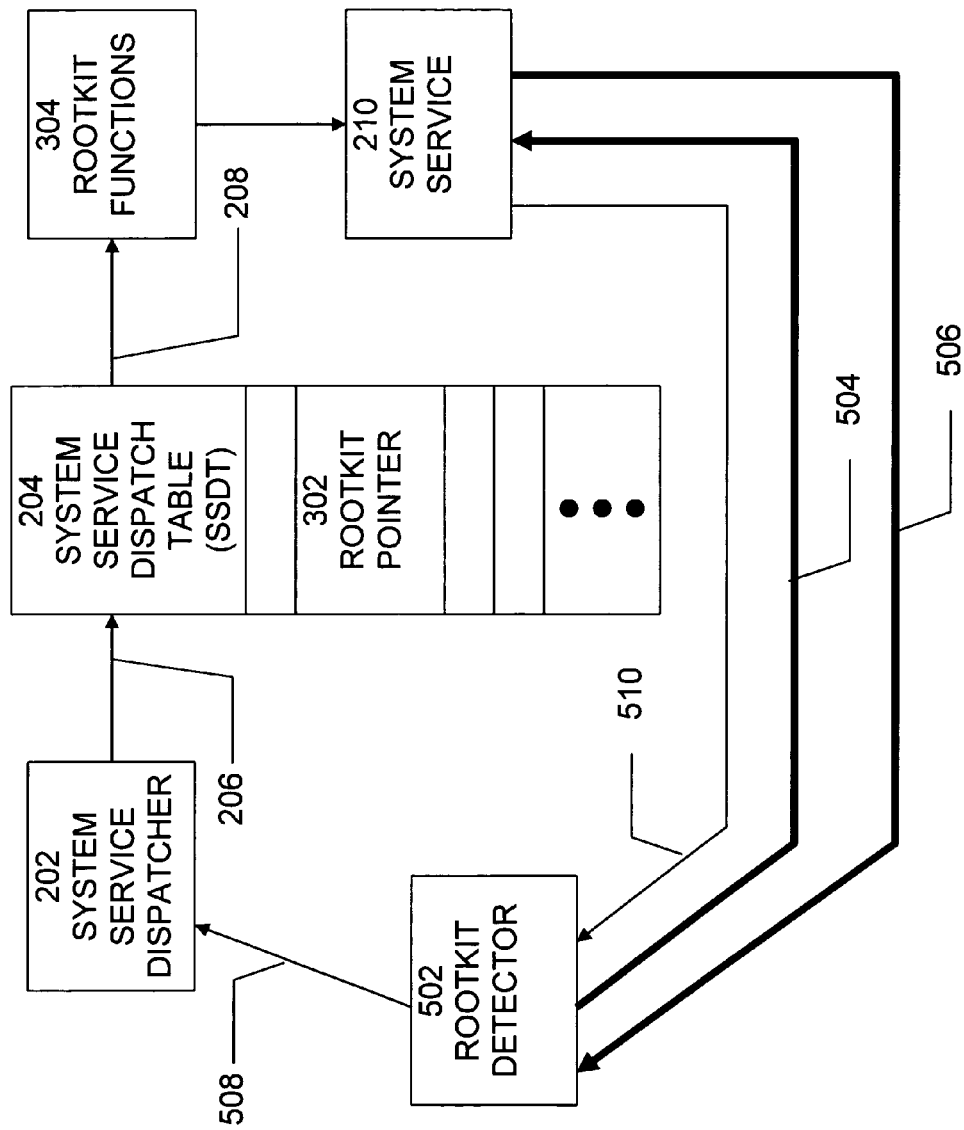
FIG. 5 is an exemplary data flow diagram of a process for detecting a rootkit.

Some of the typical functions pointers replaced by rootkits device drivers are the following:
NtQueryDirectoryFile
NtQueryInformationFile
NtQueryInformationProcess
NtQueryInformationThread
RtlQueryRegistryValues A process 400 for detecting a rootkit is shown in FIG. 4. It is best viewed in conjunction with FIG. 5, which is a data flow diagram of the process shown in FIG. 4. The process begins with step 402, in which the real addresses of the Nt functions inside the NT OS Kernel are determined. For example, the NT OS Kernel export tables can be accessed to provide these addresses, since the Nt functions are exported from the binary. In step 404, the SSDT 204 is scanned to find modifications that have been made to the SSDT 204. This is done by comparing each real address obtained in step 402 with the addresses found in the table. If any of the addresses in the SSDT 204 are different than the real address of the Nt function, this means that the SSDT has been modified.

The process will then continue with step 406, in which a rootkit detector 502 software, which includes a kernel mode device driver, calls into the Nt functions inside the NT OS Kernel. For example, rootkit detector 502 issues calls 504 to Nt functions, which directly access system services 210. The results 506 of the calls are returned to rootkit detector 502. In step 404, rootkit detector 502 issues calls to the Zw functions that correspond to the Nt functions that were called in step 402. For example, rootkit detector 502 issues calls Zw functions, which call the system service dispatcher 202, which uses SSDT 204 to access system services 210. These Zw calls cause the rootkit functions 304 to be called, which modifies the function and/or results of the call. The results 510 of the Zw calls are returned to the rootkit detector.

In step 406, the results 506 of the calls to the Nt functions and the results 506 of the calls to the Zw functions are compared. In step 408, the difference between the results obtained from Nt and Zw calls are used to identify hidden processes, registry entries, threads, files, etc.

Figure 6:
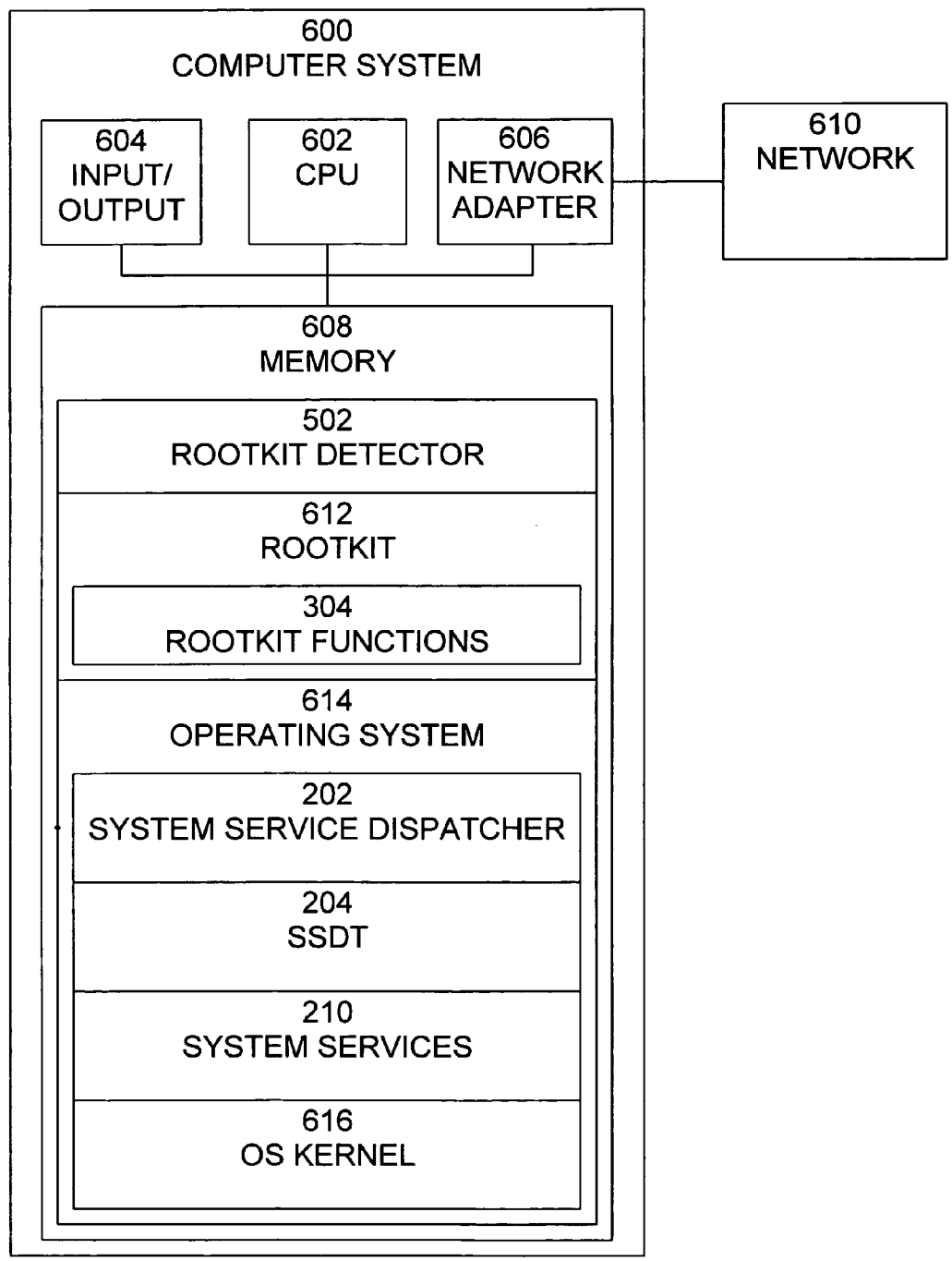
FIG. 6 is an exemplary block diagram of a computer system, in which the present invention may be implemented.

A block diagram of an exemplary computer system 600, in which the present invention may be implemented, is shown in FIG. 6. Computer system 600 is typically a programmed general-purpose computer system, such as a personal computer, workstation, server system, and minicomputer or mainframe computer. Computer system 600 includes processor (CPU) 602, input/output circuitry 604, network adapter 606, and memory 608. CPU 602 executes program instructions in order to carry out the functions of the present invention. Typically, CPU 602 is a microprocessor, such as an INTEL PENTIUM® processor, but may also be a minicomputer or mainframe computer processor. Although in the example shown in FIG. 6, computer system 600 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 600 is implemented on a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces computer system 600 with network 610. Network 610 may be any standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions of the present invention. Memory 608 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 608 includes rootkit detector 502, rootkit 612, and operating system kernel 612. Rootkit detector 502 includes a kernel mode device driver and issues calls to Nt functions, which directly access system services 210, and issues calls to the Zw functions, which correspond to the Nt functions, which call the system service dispatcher 202, which uses SSDT 204 to access system services 210. Rootkit 612 is a set of software tools intended to conceal running processes, files or system data, thereby helping an intruder to maintain access to a system whilst avoiding detection. Rootkit 612 includes rootkit functions 304, which are used by rootkit 612 to examine or modify calls to the kernel mode Zw functions and/or the user mode Nt and Zw functions. Operating system 614 includes system service dispatcher 202, which handles calls to system services, SSDT 204, which is a table of pointers to the actual Nt functions, system services 210, which are software routines and processes that perform system functions, and operating system (OS) kernel 616, which provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for detecting a rootkit, comprising:
   identifying a plurality of real addresses within an operating system kernel by accessing a plurality of kernel export tables, wherein the plurality of real addresses are associated with a kernel mode Nt function;
   scanning a system service dispatch table (SSDT) in order to determine if unwanted modifications have occurred in the SSDT, wherein the scanning includes comparing the plurality of real addresses with a plurality of addresses within the SSDT;
   determining a real address of a function that accesses a system service directly from inside the kernel for comparison with another address;
   calling the function that accesses the system service directly;
   receiving results from calling the function that accesses the system service directly;
   calling a function that accesses the system service indirectly;
   receiving results from calling the function that accesses the system service indirectly; and
   comparing the received results from calling the function that accesses the system service directly and the received results from calling the function that accesses the system service indirectly to determine presence of a rootkit, wherein the function that accesses the system service directly is the kernel mode Nt function, and the function that accesses the system service indirectly is a user mode Nt function or a Zw function.

2. The method of claim 1, wherein the step of calling the function that accesses the system service indirectly comprises the steps of:
   calling a function that obtains an address of the function that accesses a system service directly; and
   calling the function that accesses a system service directly using the obtained address.

3. The method of claim 1, wherein a particular address in the table of the function that accesses a system service directly has been replaced with an address of a rootkit function.

4. The method of claim 3, wherein the rootkit function is operable to hide a process, a thread, a file or a registry entry.

5. The method of claim 1, wherein a particular address of the kernel mode Nt function is obtained from the SSDT.

6. The method of claim 5, wherein the particular address in the SSDT of the kernel mode Nt function has been replaced with an address of a rootkit function.

7. The method of claim 6, wherein the rootkit function is operable to hide a process, a thread, a file or a registry entry.

8. The method of claim 1, wherein the real address is determined for comparison by accessing a kernel export table.

9. The method of claim 1, wherein the scanning includes comparing the real address with an address in the system service dispatch table.

10. A system for detecting a rootkit comprising:
- a processor operable to execute computer program instructions;
- a memory operable to store computer program instructions executable by the processor such that the system is configured for:
  - identifying a plurality of real addresses within an operating system kernel by accessing a plurality of kernel export tables, wherein the plurality of real addresses are associated with a kernel mode Nt function;
  - scanning a system service dispatch table (SSDT) in order to determine if unwanted modifications have occurred in the SSDT, wherein the scanning includes comparing the plurality of real addresses with a plurality of addresses within the SSDT;
  - determining a real address of a function that accesses a system service directly from inside the kernel for comparison with another address;
  - calling the function that accesses the system service directly;
  - receiving results from calling the function that accesses the system service directly;
  - calling a function that accesses the system service indirectly;
  - receiving results from calling the function that accesses the system service indirectly; and
  - comparing the received results from calling the function that accesses the system service directly and the received results from calling the function that accesses the system service indirectly to determine presence of a rootkit, wherein the function that accesses the system service directly is the kernel mode Nt function, and the function that accesses the system service indirectly is a user mode Nt function or a Zw function.

11. The system of claim 10, wherein the step of calling the function that accesses the system service indirectly comprises the steps of:
- calling a function that obtains an address of the function that accesses a system service directly; and
- calling the function that accesses a system service directly using the obtained address.

12. The system of claim 10, wherein a particular address in the table of the function that accesses a system service directly has been replaced with an address of a rootkit function.

13. The system of claim 12, wherein the rootkit function is operable to hide a process, and a thread.

14. The system of claim 10, wherein a particular address of the kernel mode Nt function is obtained from the system service dispatch table.

15. The system of claim 14, wherein the particular address in the system service dispatch table of the kernel mode Nt function has been replaced with an address of a rootkit function.

16. The system of claim 15, wherein the rootkit function is operable to hide a file or a registry entry.

17. A computer program product for detecting a rootkit comprising:
- a non-transitory computer readable storage medium;
- computer program instructions, recorded on the non-transitory computer readable storage medium:
  - identifying a plurality of real addresses within an operating system kernel by accessing a plurality of kernel export tables, wherein the plurality of real addresses are associated with a kernel mode Nt function;
  - scanning a system service dispatch table (SSDT) in order to determine if unwanted modifications have occurred in the SSDT, wherein the scanning includes comparing the plurality of real addresses with a plurality of addresses within the SSDT;
  - determining a real address of a function that accesses a system service directly from inside the kernel for comparison with another address;
  - calling the function that accesses the system service directly;
  - receiving results from calling the function that accesses the system service directly;
  - calling a function that accesses the system service indirectly;
  - receiving results from calling the function that accesses the system service indirectly; and
  - comparing the received results from calling the function that accesses the system service directly and the received results from calling the function that accesses the system service indirectly to determine presence of a rootkit, wherein the function that accesses the system service directly is the kernel mode Nt function, and the function that accesses the system service indirectly is a user mode Nt function or a Zw function.

18. The computer program product of claim 17, wherein the step of calling the function that accesses the system service indirectly comprises the steps of:
- calling a function that obtains an address of the function that accesses a system service directly; and
- calling the function that accesses a system service directly using the obtained address.

19. The computer program product of claim 17, wherein a particular address in the table of the function that accesses a system service directly has been replaced with an address of a rootkit function.

20. The computer program product of claim 17, wherein a particular address of the kernel mode Nt function is obtained from the system service dispatch table.

21. The computer program product of claim 20, wherein a particular address in the system service dispatch table of the kernel mode Nt function has been replaced with an address of a rootkit function.

22. The computer program product of claim 21, wherein the rootkit function is operable to hide a process, a thread, a file and a registry entry.

* * * * *